United States Patent
Sim et al.

(10) Patent No.: US 9,075,603 B2
(45) Date of Patent: Jul. 7, 2015

(54) METHOD AND APPARATUS FOR WAKING DEVICE FROM POWER SAVE MODE

(75) Inventors: Dae-yong Sim, Hwaseong-si (KR); Il-ju Na, Yongin-si (KR); Jae-min Lee, Suwon-si (KR); Chil-youl Yang, Seoul (KR); Lochan Verma, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 552 days.

(21) Appl. No.: 13/013,281

(22) Filed: Jan. 25, 2011

(65) Prior Publication Data

US 2011/0185200 A1    Jul. 28, 2011

Related U.S. Application Data

(60) Provisional application No. 61/298,647, filed on Jan. 27, 2010, provisional application No. 61/297,949, filed on Jan. 25, 2010.

(30) Foreign Application Priority Data

Jan. 24, 2011 (KR) ........................ 10-2011-0006817

(51) Int. Cl.
*G06F 1/32* (2006.01)
*H04L 12/12* (2006.01)

(52) U.S. Cl.
CPC ............ *G06F 1/3203* (2013.01); *G06F 1/3234* (2013.01); *G06F 1/3206* (2013.01); *G06F 1/325* (2013.01); *H04L 12/12* (2013.01); *Y02B 60/34* (2013.01)

(58) Field of Classification Search
CPC ... G06F 1/3203; G06F 1/3234; G06F 1/3206; G06F 1/325; H04L 12/12; Y02B 60/34
See application file for complete search history.

(56) References Cited

U.S. PATENT DOCUMENTS

| | | | | |
|---|---|---|---|---|
| 6,131,167 A | * | 10/2000 | Cruz | 713/320 |
| 6,192,230 B1 | * | 2/2001 | van Bokhorst et al. | 455/343.3 |
| 2005/0129009 A1 | * | 6/2005 | Kitchin | 370/389 |
| 2006/0133408 A1 | * | 6/2006 | Nogueira-Nine et al. | 370/447 |
| 2007/0127403 A1 | * | 6/2007 | Lu et al. | 370/311 |
| 2009/0052372 A1 | * | 2/2009 | Durazzo et al. | 370/318 |
| 2009/0205038 A1 | * | 8/2009 | Kumar et al. | 726/11 |

(Continued)

FOREIGN PATENT DOCUMENTS

JP    2012095032 A    *    5/2012

OTHER PUBLICATIONS

"Wi-Fi CERTIFIED™ Wi-Fi Direct Frequently Asked Questions". Wi-Fi Alliance. Oct. 19, 2009. pp. 1-4.*

(Continued)

*Primary Examiner* — Thomas J Cleary
(74) *Attorney, Agent, or Firm* — Sughrue Mion, PLLC

(57) ABSTRACT

A method for waking a device from a power save mode to an active mode includes: transmitting, by a first device, a magic packet through a predetermined channel to a second device, which operates in the power save mode by repeating a doze state and an awake state according to a predetermined period of time, for notifying the second device to switch to the active mode; and retransmitting the magic packet to the second device through the predetermined channel if a response to the magic packet has not been received from the second device and a predetermined time has not elapsed after transmitting the magic packet through the predetermined channel.

25 Claims, 10 Drawing Sheets

(56) References Cited

U.S. PATENT DOCUMENTS

| | | | |
|---|---|---|---|
| 2011/0026504 A1* | 2/2011 | Feinberg | 370/338 |
| 2011/0032836 A1* | 2/2011 | Maruhashi | 370/252 |
| 2011/0063673 A1* | 3/2011 | Yoshida et al. | 358/1.15 |
| 2011/0082939 A1* | 4/2011 | Montemurro et al. | 709/227 |
| 2011/0103264 A1* | 5/2011 | Wentink | 370/255 |
| 2011/0176463 A1* | 7/2011 | Cowan et al. | 370/311 |
| 2012/0134349 A1* | 5/2012 | Jung et al. | 370/338 |

OTHER PUBLICATIONS

Lieberman, Philip. "Wake on LAN Technology". Revision 1. Jul. 11, 2002. Lieberman & Associates.*

Wi-Fi Alliance Technical Committee P2P Task Group, Wi-Fi Peer-to-Peer (P2P) Technical Specification, Version 1.00, pp. 1-135, Wi-Fi Alliance Confidential, Wi-Fi Alliance 2009.

Wi-Fi Alliance Technical Committee Display Task Group, Wi-Fi Display Specification, Wi-Fi Alliance, Version 1.0, Dec. 2, 2010.

IEEE Standard for Information Technology Telecommunications and Information Exchange Between Systems Local and Metropolitan Area Networks Specific Requirements, Part 11: Wireless LAN Medium Access Control (MAC) and Physical Layer (PHY) Specification, IEEE Std 802.11™, Jun. 12, 2007.

* cited by examiner

FIG. 8

| Bit(s) | Information | Notes |
|---|---|---|
| 0 | Service Discovery | The Service Discovery field shall be set to 1 if the P2P Device supports Service Discovery, and is set to 0 otherwise. |
| 1 | P2P Client Discoverability | Within a P2P Group Info subelement and a (re) association request frame the P2P Client Discoverability field shall be set to 1 when the P2P Device supports P2P Client Discoverability, and is set to 0 otherwise. This field shall be reserved and set to 0 in all other frames or uses. |
| 2 | Concurrent Operation | The Concurrent Operation field shall be set to 1 when the P2P Device supports Concurrent Operation with WLAN, and is set to 0 otherwise. |
| 3 | P2P Infrastructure Managed | The P2P Infrastructure Managed field shall be set to 1 when the P2P interface of the P2P Device is capable of being managed by the WLAN (infrastructure network) based on P2P Coexistence Parameters, and set to 0 otherwise. |
| 4 | P2P Device Limit | The P2P Device Limit field shall be set to 1 when the P2P Device is unable to participate in additional P2P Groups, and set to 0 otherwise. |
| 5 | P2P Invitation Procedure | The P2P Invitation Procedure field shall be set to 1 if the P2P Device is capable of processing P2P Invitation Procedure signaling, and set to 0 otherwise |
| 6-7 | Reserved | – |

FIG. 9

| Type | Notes |
|---|---|
| 0 | GO Negotiation Request |
| 1 | GO Negotiation Response |
| 2 | GO Negotiation Confirmation |
| 3 | P2P Invitation Request |
| 4 | P2P Invitation Response |
| 5 | Device Discoverability Request |
| 6 | Device Discoverability Response |
| 7 | Provision Discovery Request |
| 8 | Provision Discovery Response |
| 9-255 | Reserved |

FIG. 10

| Type | Notes |
|---|---|
| 0 | Notice of Absence |
| 1 | P2P Presence Request |
| 2 | P2P Presence Response |
| 3 | GO Discoverability Request |
| 4-255 | Reserved |

METHOD AND APPARATUS FOR WAKING DEVICE FROM POWER SAVE MODE

CROSS-REFERENCE TO RELATED PATENT APPLICATION

This application claims the benefits of U.S. Patent Application No. 61/297,949, filed on Jan. 25, 2010, and U.S. Patent Application No. 61/298,647, field on Jan. 27, 2010, in the United States Patent and Trademark Office, and Korean Patent Application No. 10-2011-0006817, filed on Jan. 24, 2011, in the Korean Intellectual Property Office, the disclosures of which are incorporated herein in their entirety by reference.

BACKGROUND

1. Field

The present invention generally relates to a method and apparatus for waking a device from a power save mode, and more particularly, to a method and apparatus for remotely waking a device in Peer to Peer (P2P) communication.

2. Description of the Related Art

Recently, a wireless fidelity (Wi-Fi) P2P (or Wi-Fi Direct (WFD)) standard has been defined to more conveniently support a connection between devices than conventional Wi-Fi, and a Wi-Fi Display standard has been defined according to demands of satisfactorily transmitting audio/video data of high quality and low delay. Since Wi-Fi P2P supports a different power save function from conventional Wi-Fi, technology of remotely waking a Wi-Fi P2P device from a power save mode to an active mode is required.

SUMMARY

One or more exemplary embodiments provide a method and apparatus for remotely waking a device in Peer to Peer (P2P) communication.

According to an aspect of an exemplary embodiment, there is provided a method for switching a second device from a power save mode to an active mode by a first device. The method may include transmitting, by the first device, a magic packet through a predetermined channel to the second device, which operates in the power save mode by repeating a doze state and an awake state periodically according to a predetermined period of time, for notifying the second device to switch to the active mode; and retransmitting the magic packet to the second device through the predetermined channel if a response to the magic packet has not been received from the second device and a predetermined time has not elapsed after transmitting the magic packet through the predetermined channel.

The method may further include transmitting the magic packet through a different channel from the predetermined channel if a response to the magic packet has not been received from the second device and the predetermined time has elapsed after first transmitting the magic packet through the predetermined channel.

The predetermined time may be longer than a time for the second device to be in the doze state.

The predetermined time may be the same as the predetermined period of time.

The predetermined period of time may be a beacon interval.

The predetermined channel may include a channel which was last used by the first device to communicate with the second device.

The predetermined channel may include a social channel.

The method may further include the first device forming a Peer to Peer (P2P) group with the second device if a response to the magic packet has been received from the second device.

The forming of the P2P group may include the first device forming the P2P group with the second device by using Credentials stored in the first device.

The first device may be a P2P client and the second device may be a P2P group owner.

The magic packet may be a probe request frame, wherein a value of a bit 6 or 7 of a device capability bitmap field of a P2P capability subelement of the probe request frame is 1.

The magic packet may be a P2P public action frame, a type value of which is one of 9 to 255.

The magic packet may be a P2P action frame, a type value of which is one of 4 to 255.

The first device and the second device may be wireless fidelity (Wi-Fi) P2P devices.

According to another aspect of an exemplary embodiment, there is provided a method for switching a second device from a power save mode to an active mode by a first device. The method may include performing synchronization by forming a Peer to Peer (P2P) group with the second device; and transmitting, by the first device, a magic packet notifying the second device to switch to the active mode when the second device operating in the power save mode by repeating a doze state and an awake state is in the awake state, based on the synchronization.

One of the first device and the second device may be a P2P client, the other of the first device and the second device may be a P2P group owner, and when the second device is in the awake state, the P2P group owner may transmit a beacon to the P2P client.

The first device may be a P2P client and the second device may be a P2P group owner.

The transmitting of the magic packet may include transmitting the magic packet to the second device after receiving a beacon from the second device when the second device is in the awake state.

The transmitting of the magic packet may include transmitting the magic packet to the second device within a Client Traffic Window (CTWindow).

According to another aspect of an exemplary embodiment, there is provided a method for switching from a power save mode to an active mode in a second device communicating with a first device. The method may include receiving, from the first device, a magic packet for notifying the second device to switch to the active mode when the second device operating in the power save mode by repeating a doze state and an awake state is in the awake state; and switching to the active mode upon receiving the magic packet.

The receiving of the magic packet may include the second device receiving the magic packet in a state of not being synchronized with the first device.

The method may further include the second device forming a Peer to Peer (P2P) group with the first device after switching to the active mode.

The forming of the P2P group may include the second device forming the P2P group with the first device by using Credentials stored in the second device.

The method may further include performing synchronization by the second device forming a P2P group with the first device, wherein the receiving of the magic packet includes receiving the magic packet from the first device based on the synchronization when the second device is in the awake state.

The first device may be a P2P client and the second device may be a P2P group owner.

The receiving of the magic packet by the second device may include receiving the magic packet from the first device after transmitting a beacon to the first device when the second device is in the awake state.

According to another aspect of an exemplary embodiment, there is provided an apparatus for switching a peer device from a power save mode to an active mode. The apparatus may include a transmitter for transmitting through a predetermined channel a magic packet for notifying the peer device, which operates in the power save mode by repeating a doze state and an awake state periodically according to a predetermined period of time to switch to the active mode; and a receiver for receiving a response to the magic packet from the peer device, wherein the transmitter retransmits the magic packet to the peer device through the predetermined channel if a response to the magic packet has not been received from the peer device and a predetermined time has not elapsed after transmitting the magic packet through the predetermined channel.

According to another aspect of an exemplary embodiment, there is provided an apparatus for switching a peer device from a power save mode to an active mode. The apparatus may include a synchronizer for performing synchronization by forming a Peer to Peer (P2P) group with the peer device; and a transmitter for transmitting a magic packet notifying the peer device to switch to the active mode when the peer device operating in the power save mode by repeating a doze state and an awake state is in the awake state, based on the synchronization.

According to another aspect of an exemplary embodiment, there is provided an apparatus for switching a peer device from a power save mode to an active mode. The apparatus may include a receiver for receiving a magic packet for notifying the peer device when the peer device operating in the power save mode by repeating a doze state and an awake state is in the awake state to switch to the active mode; and a switching unit for switching to the active mode upon receiving the magic packet.

According to another aspect of an exemplary embodiment, there is provided a method of switching a wireless fidelity peer to peer (Wi-Fi P2P) device from a power save mode to an active mode. The method may include setting a value of bit 6 or 7 of a device capability bitmap field of a P2P capability subelement of a probe request frame according to a Wi-Fi P2P standard to 1; and transmitting the probe request frame notifying the Wi-Fi P2P device, which operates in a power save mode by repeating a doze state and an awake state, to switch to an active mode based on the value of bit 6 or 7 being set to 1.

According to another aspect of an exemplary embodiment, there is provided a method of switching a wireless fidelity peer to peer (Wi-Fi) P2P device from a power save mode to an active mode. The method may include setting a type value of a P2P public action frame to one of 9 to 255; and transmitting the P2P public action frame notifying the Wi-Fi P2P device, which operates in a power save mode by repeating a doze state and an awake state to switch to an active mode based on the type value of the P2P public action frame being one of 9 to 255.

According to another aspect of an exemplary embodiment, there is provided a method of switching a wireless fidelity peer to peer (Wi-Fi) P2P device from a power save mode to an active mode. The method may include setting a type value of a P2P action frame to one of 4 to 255; and transmitting the P2P action frame notifying the Wi-Fi P2P device, which operates in a power save mode by repeating a doze state and an awake state to switch to an active mode based on the type value of the P2P action frame being one of 4 to 255.

According to another aspect of an exemplary embodiment, there is provided a computer-readable recording medium storing a computer-readable program for executing any of the methods.

BRIEF DESCRIPTION OF THE DRAWINGS

The above and other features and advantages of the present inventive concept will become more apparent by describing in detail exemplary embodiments thereof with reference to the attached drawings in which:

FIG. 8 is a table defining a device capability bitmap field of Wi-Fi P2P;

FIG. 9 is a table defining types of a P2P public action frame of Wi-Fi P2P;

FIG. 10 is a table defining types of a P2P action frame of Wi-Fi P2P;

DETAILED DESCRIPTION

Figure 1:
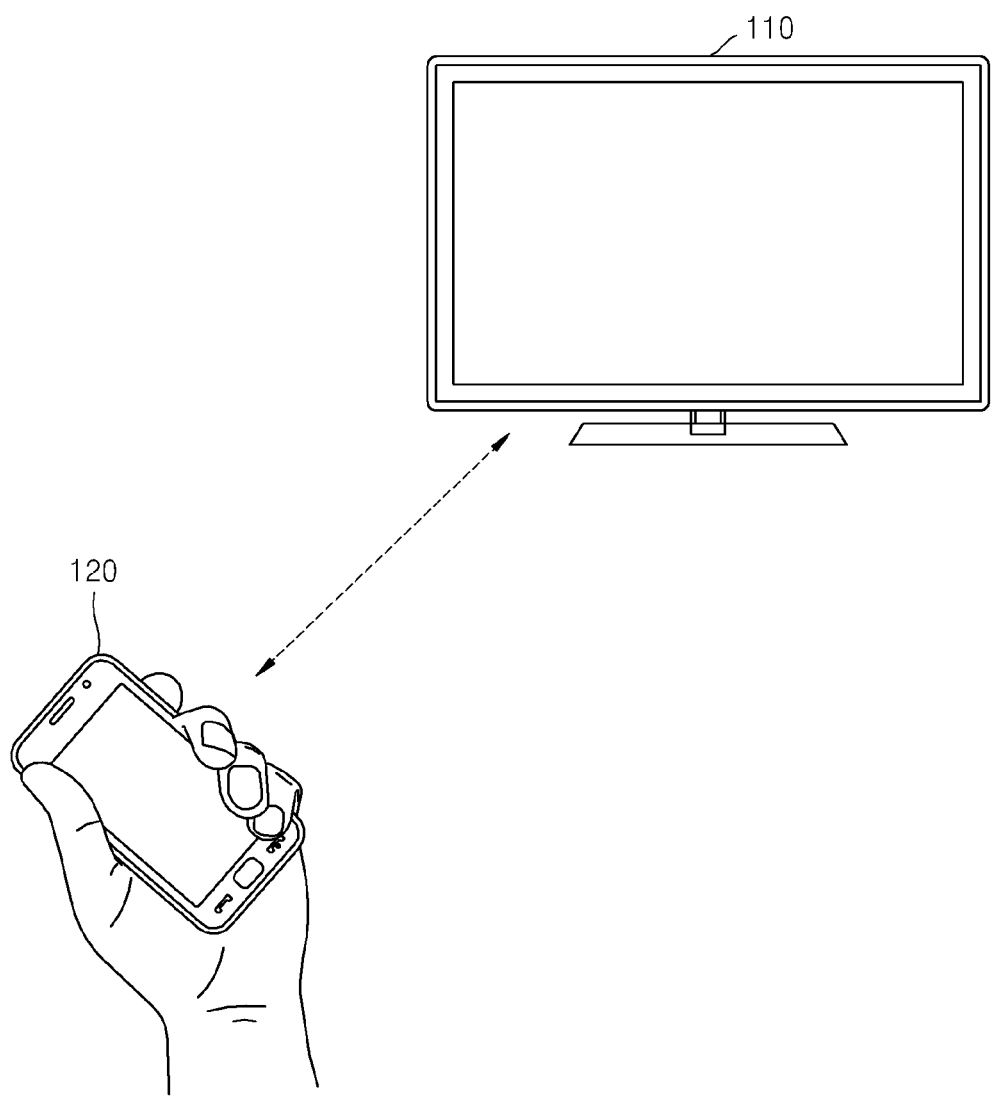
FIG. 1 illustrates a use case in which a Peer to Peer (P2P) group owner communicates with a P2P client, according to an exemplary embodiment.

Hereinafter, the present inventive concept will be described more fully with reference to the accompanying drawings, in which one of more exemplary embodiments of the invention are shown. The present inventive concept may, however, be embodied in many different forms and should not be construed as being limited to the exemplary embodiments set forth herein; rather, these exemplary embodiments are provided so that this disclosure will be thorough and complete, and will fully convey the inventive concept to those of ordinary skill in the art.

Also, while describing the present inventive concept, detailed descriptions about related well-known functions or configurations that may diminish the clarity of the points of the present inventive concept are omitted. The terms used herein are defined considering functions in the present inventive concept, and thus may differ according to intentions or customs of a user or an operator. Accordingly, the terms are defined based on the overall descriptions in the specification. Also, when a part "includes" an element, the part may include another element unless otherwise defined. For convenience of description, an apparatus and a method may be described together if required.

In the drawings, like reference numerals denote like elements, and if required, an element shown on another drawing may be referred to. The sizes of elements may be exaggerated for clarity.

Hereinafter, one or more exemplary embodiments of the present inventive concept will be described with reference to the attached drawings.

FIG. 1 illustrates a use case in which a Peer to Peer (P2P) group owner 110 communicates with a P2P client 120, according to an exemplary embodiment. The P2P group owner (or group owner) 110 in wireless fidelity (Wi-Fi) P2P acts similarly to an Access Point (AP) in conventional Wi-Fi, and the P2P client (or client) 120 in Wi-Fi P2P acts similarly to a station (STA) in conventional Wi-Fi.

A Wi-Fi P2P device includes a host and a Network Interface Card (NIC), wherein the host and the NIC may exist on a single board or may be connected to each other via a slot or cable. In a power save state, the host is powered on but switched off, and the NIC operates in a power save mode in a state of being powered on. Here, a switch-off state indicates standby, sleep, hibernation, or soft off. When the NIC wakes up from the power save mode to an active mode, the NIC makes the host wake from the switch-off state, such as hibernation. As described above, although the NIC of the Wi-Fi P2P device may operate as a group owner or a client in the strict sense, the Wi-Fi P2P device itself is also called a group owner or a client for convenience of description.

While a separate AP must exist besides the STAs in conventional Wi-Fi, any device can be a group owner in Wi-Fi P2P, according to the use of more mobile devices. Accordingly, Wi-Fi P2P supports a power save function of a group owner, which has not been supported in conventional Wi-Fi.

Conventional Wake on WLAN (WoWL) is technology limited to contents defined in conventional Wi-Fi. That is, STAs must operate in an infrastructure mode and be associated with an AP supporting Wi-Fi Protected Access version 2 (WPA2) authentication. In addition, the AP must be always in an active state. That is, the power save mode of the AP is not supported. Thus, there is limitation to wake the client 120 in Wi-Fi P2P from the power save mode by using the WoWL technology. In addition, WoWL defines only a case where the AP wakes an STA and does not consider a case where an STA wakes the AP. Accordingly, there is also limitation to wake the group owner 110 in Wi-Fi P2P from the power save mode by using the WoWL technology.

Figure 2:
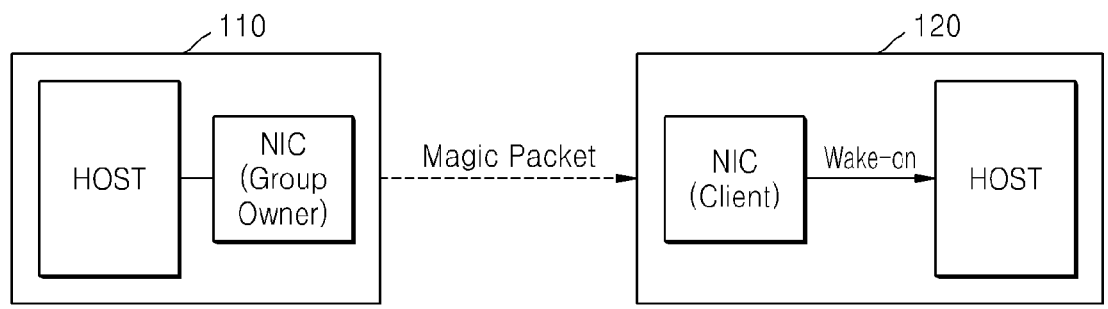
FIG. 2 is a schematic diagram for describing a method for waking a client by a group owner, according to an exemplary embodiment.

FIG. 2 is a schematic diagram for describing a method for waking the client 120 by the group owner 110, according to an exemplary embodiment. The group owner 110 wakes the client 120 from the power save mode to the active mode by transmitting a specific packet called as a magic packet to the client 120 operating in the power save mode.

Figure 3:
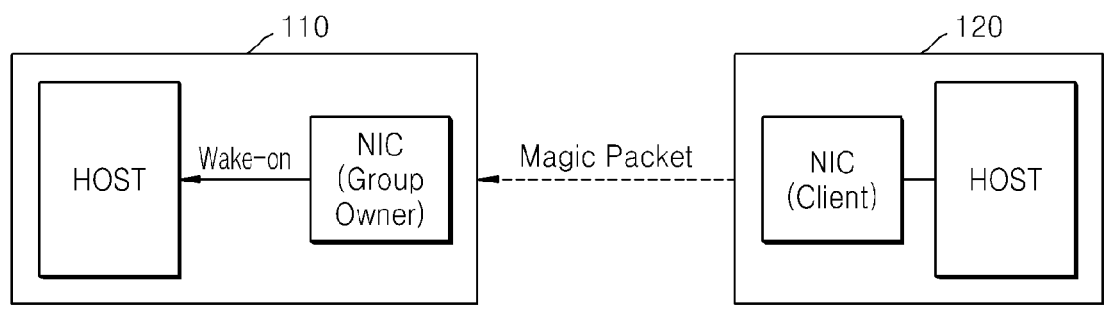
FIG. 3 is a schematic diagram for describing a method for waking a group owner by a client, according to an exemplary embodiment.

FIG. 3 is a schematic diagram for describing a method for waking the group owner 110 by the client 120, according to an exemplary embodiment. The client 120 wakes the group owner 110 from the power save mode to the active mode by transmitting a magic packet to the group owner 110 operating in the power save mode.

Figure 4:
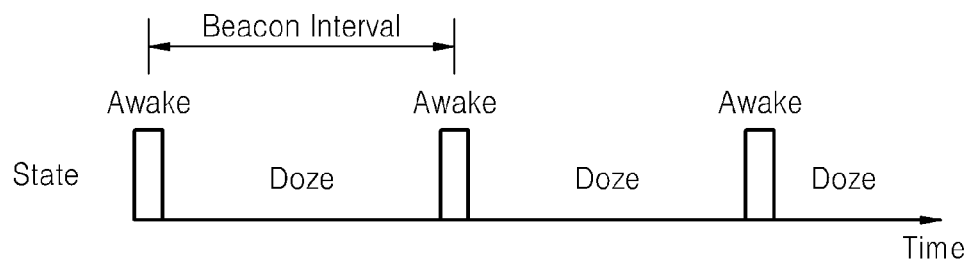
FIG. 4 is a graph showing an operation of a wireless fidelity (Wi-Fi) P2P device in a power save mode, according to an exemplary embodiment.

FIG. 4 is a graph showing an operation of a Wi-Fi P2P device in the power save mode, according to an exemplary embodiment. The Wi-Fi P2P device operating in the power save mode repeats an awake state and a doze state periodically according to a period of time of a beacon interval. When the group owner 110 and the client 120 are synchronized by forming a P2P group, each device knows when a peer device is in the awake state. However, when the group owner 110 and the client 120 do not form a P2P group, since they are not synchronized, each device does not know when a peer device is in the awake state. The present inventive concept provides a method for waking a peer device not only when the group owner 110 and the client 120 form a P2P group but also when the group owner 110 and the client 120 do not form a P2P group. It may be premised that the group owner 110 and the client 120 store Credentials by forming a persistent group.

Figure 5:
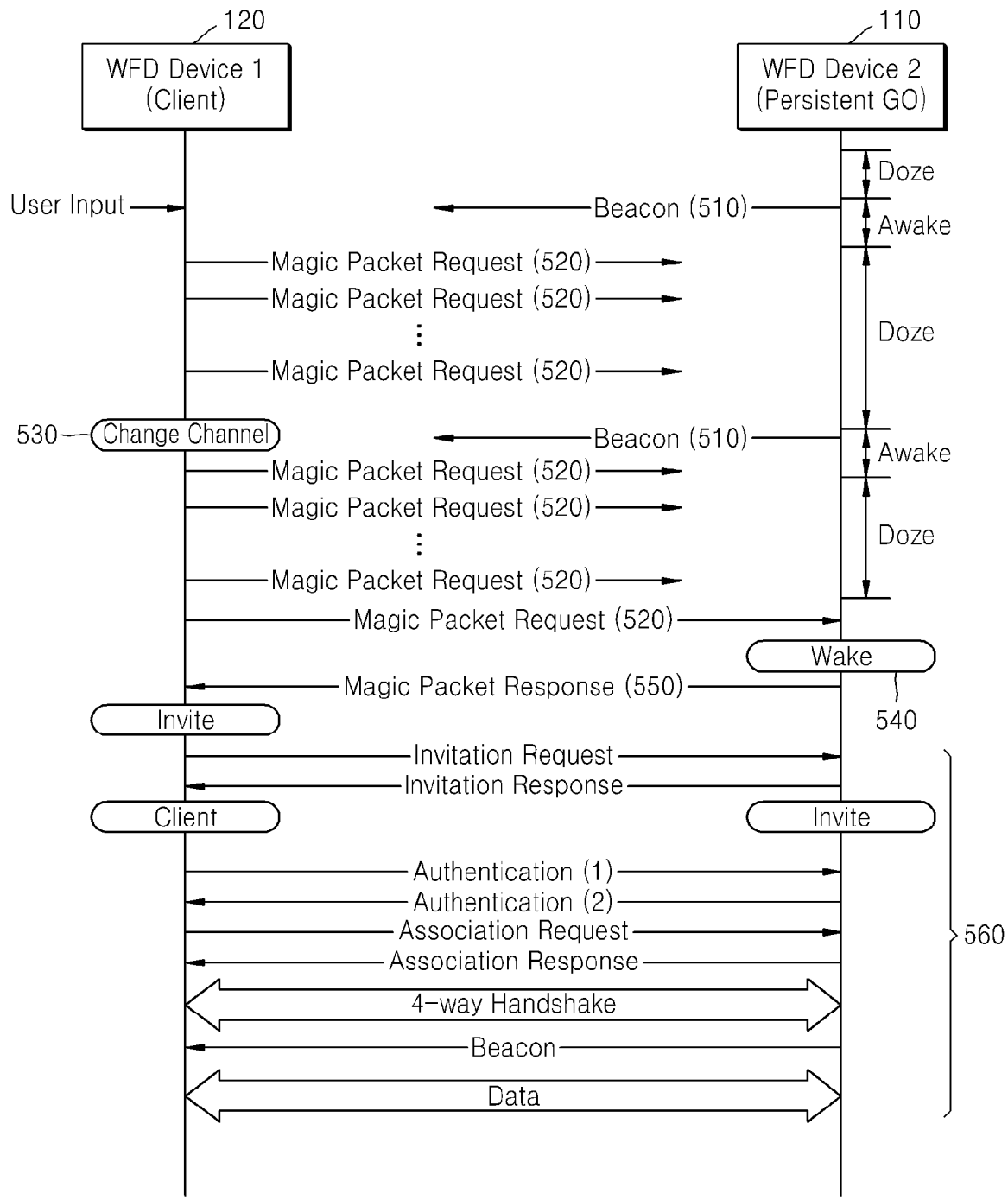
FIG. 5 is a sequence diagram of a method for waking a group owner by a client in a state where a P2P group is not formed, according to an exemplary embodiment.

FIG. 5 is a sequence diagram of a method for waking the group owner (GO) 110 by the client 120 in a state where a P2P group is not formed, according to an exemplary embodiment. For convenience of description, it is assumed that the client 120 is a Blu-ray Disc (BD) player, which is a source device, and the group owner 110 is a television (TV), which is a sink device. In addition, although the method for waking the group owner 110 by the client 120 is mainly described for convenience of description, the method described below is also applicable to a case of waking the client 120 by the group owner 110.

In operation 510, the group owner 110 of the persistent group transmits a beacon by periodically waking to the awake state while operating in the power save mode.

When the client 120 is triggered by a user's input, for example, when the user desires to watch a BD, the client 120 transmits a magic packet to the group owner 110 through a predetermined channel. At this time, since the client 120 does not know when the group owner 110 is in the awake state, the client 120 repeatedly transmits the magic packet until a response to the magic packet is received from the group owner 110. If the group owner 110 uses the same channel as the client 120 uses, the group owner 110 receives the magic packet within one period of time, i.e., a beacon interval. Accordingly, if a response to the magic packet is not received, the client 120 repeatedly transmits the magic packet for at least one beacon interval through one channel.

If the client 120 has not received a response from the group owner 110 over one period of time, the client 120 repeatedly transmits the magic packet in operation 520 by changing the transmission channel to another channel in operation 530. If the client 120 has not received a response from the group owner 110 until another one period of time elapses, the client 120 repeats operations 530 and 520 of repeatedly transmitting the magic packet by changing the transmission channel to another channel.

According to an exemplary embodiment, the client 120 may first use a channel which was last used to communicate with the group owner 110. If the group owner 110 uses the last used channel, the group owner 110 receives the magic packet within one period of time, i.e., one beacon interval.

According to another exemplary embodiment, the client 120 may first use social channels. The social channels include channels 1, 6, and 11 in a 2.4 GHz band. If the group owner 110 uses one of the social channels, the group owner 110 receives the magic packet within three periods of time, i.e., three times the beacon interval.

According to another exemplary embodiment, the client 120 may first use a channel which was last used to communicate with the group owner 110, and then use the social channels. In this case, if the group owner 110 uses one of the last used channel and the social channels, the group owner 110 receives the magic packet within four periods of time.

If the client 120 knows the length of the period in which the group owner 110 is in the doze state, the client 120 may repeatedly transmit the magic packet for a longer time than the doze period of time through a channel. Thus, the client 120 can reduce a time of seeking for the group owner 110 by changing a channel in a period of time longer than the doze period of time.

The group owner 110 which has received the magic packet switches to the active state in operation 540 and notifies the client 120 of success or failure by transmitting a response to the magic packet in operation 550.

When the client 120 receives a success response as a response to the magic packet from the group owner 110, the client 120 transmits and receives data to and from the group owner 110 by forming a P2P group with the group owner 110 in operation 560. That is, the client 120 enters into an invitation phase and forms a persistent P2P group in a channel determined by exchanging invitation request and response messages. The both devices know how WPA authentication is performed through Credentials shared after determining roles of the group owner 110 and the client 120 in an existing persistent group. Thus, the client 120 accesses the group owner 110 through authentication and association request and response without Wi-Fi Protected Setup (WPS) negotiation. Thereafter, 4-way handshake, which is WPA negotiation, is performed. Security setup is performed through the WPA negotiation. As described above, after an access in a second layer is achieved between the two devices, data transmission starts in an application layer, thereby outputting images of the BD player to the TV.

Figure 6:
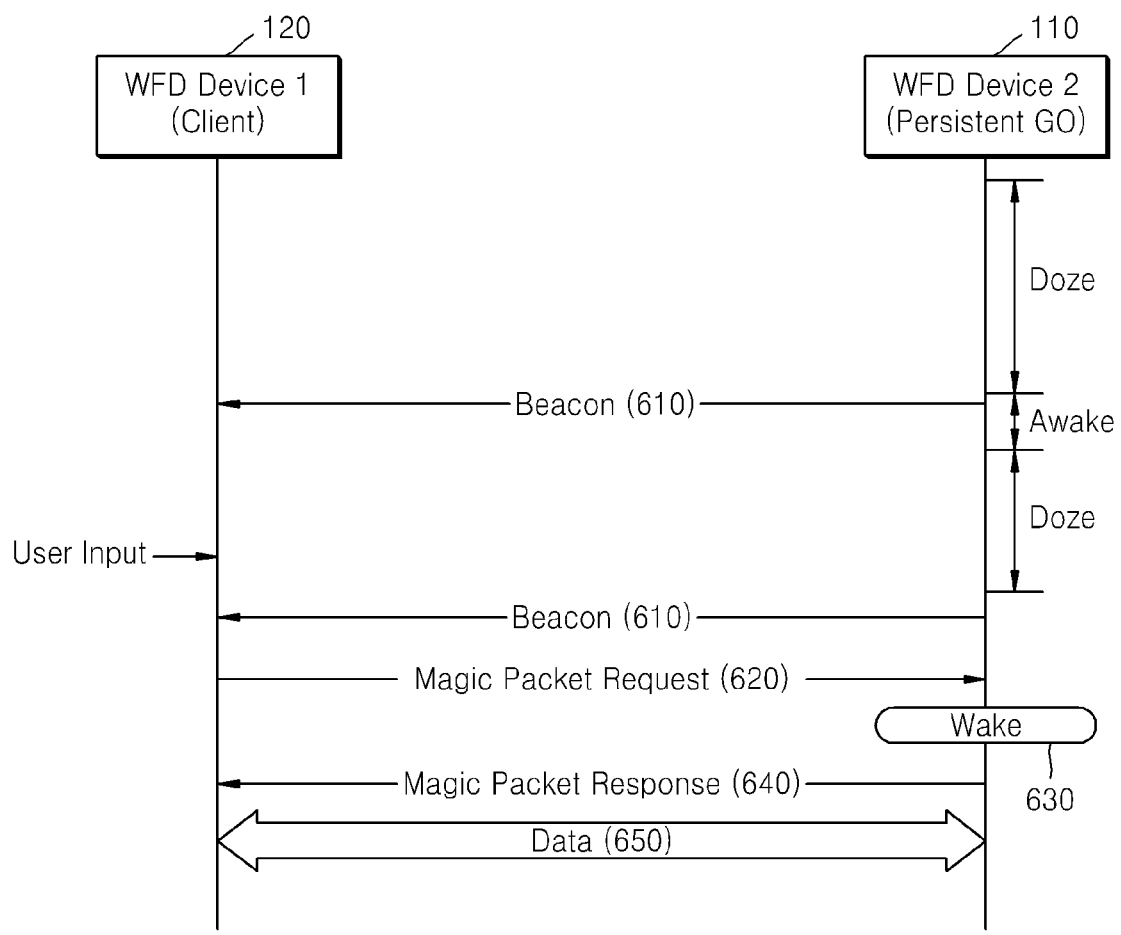
FIG. 6 is a sequence diagram of a method for waking a group owner by a client in a state where a P2P group is formed, according to an exemplary embodiment.

FIG. 6 is a sequence diagram of a method for waking the group owner 110 by the client 120 in a state where a P2P group is formed, according to an exemplary embodiment. Although the method for waking the group owner 110 by the client 120 is mainly described for convenience of description, the method described below is also applicable to a case of waking the client 120 by the group owner 110.

Since the client 120 and the group owner 110 belong to the same group, the client 120 and the group owner 110 are synchronized. In operation 610, the group owner 110 transmits information regarding the group to group members or a new client or performs synchronization with the group members or the new client by transmitting a beacon after switching from the doze state to the awake state. Thus, a BD player, which is the synchronized client 120, knows when the beacon is transmitted, i.e., when the group owner 110 is switched to the awake state. When the client 120 is triggered by a user's input, the client 120 transmits a magic packet in operation 620 within a CTWindow of the group owner 110 after receiving the beacon transmitted by the group owner 110 in the awake state.

Upon receiving the magic packet, the group owner 110 switches to the active mode in operation 630 and transmits a response to the magic packet to the client 120 in operation 640. By doing this, the two devices belonging to a persistent group are ready to transmit data. Thereafter, data transmission is performed in a third layer in operation 650.

Figure 7:
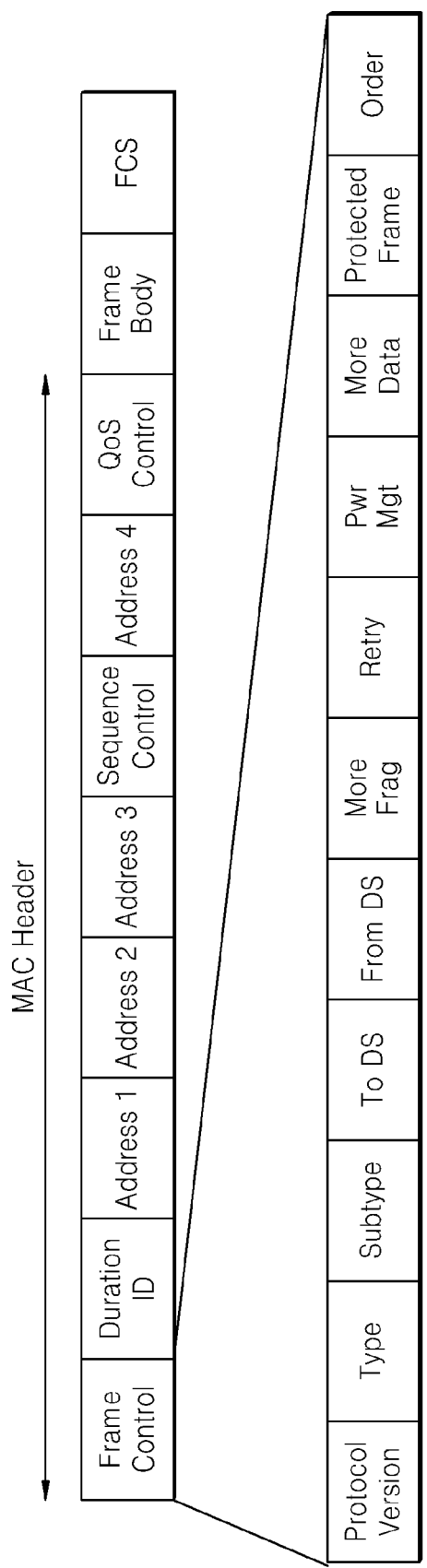
FIG. 7 illustrates a Media Access Control (MAC) frame format of Institute of Electrical and Electronics Engineers (IEEE) 802.11.

A magic packet according to an exemplary embodiment conforms to Institute of Electrical and Electronics Engineers (IEEE) 802.11 and Wi-Fi P2P standards. Even though the magic packet is formed in any format, the magic packet includes contents of a command for changing a value of a power management field, which is a subfield of a frame control field of a device receiving the magic packet, from 1 to 0. That is, the magic packet includes a request of waking from the power save mode and preparing to receive image data. FIG. 7 is a Media Access Control (MAC) frame format of IEEE 802.11.

According to an exemplary embodiment, a magic packet is a probe request frame and can be implemented by a method of adding a value to a reserved bit of a device capability bitmap field of a P2P capability bitmap subelement, which is one of subelements of the probe request frame. FIG. 8 is a table defining a device capability bitmap field of Wi-Fi P2P. When a value of a bit 6 or 7 of the device capability bitmap field is 1, the value may indicate a magic packet.

According to another exemplary embodiment, a magic packet is a P2P public action frame and can be implemented by a method of using a reserved type of the P2P public action frame. FIG. 9 is a table defining types of a P2P public action frame of Wi-Fi P2P. When a type value of the P2P public action frame is one of 9 to 255, the type value may indicate a magic packet.

According to another exemplary embodiment, a magic packet is a P2P action frame and can be implemented by a method of using a reserved type of the P2P action frame. FIG. 10 is a table defining types of a P2P action frame of Wi-Fi P2P. When a type value of the P2P action frame is one of 4 to 255, the type value may indicate a magic packet.

Figure 11:
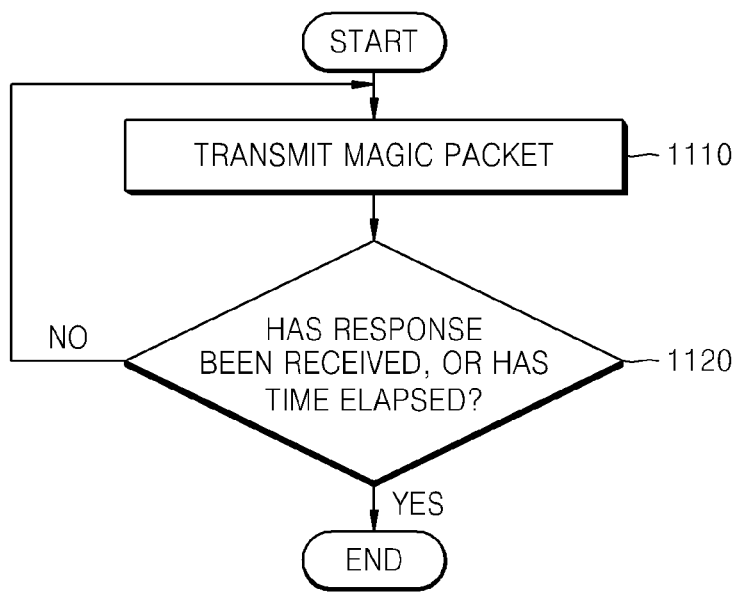
FIG. 11 is a flowchart of a method for switching a second device from a power save mode to an active mode by a first device, according to an exemplary embodiment.

FIG. 11 is a flowchart of a method for switching a second device from the power save mode to the active mode by a first device, according to an exemplary embodiment. Referring to FIG. 11, the method for switching the second device from the power save mode to the active mode by the first device includes transmitting a magic packet to the second device, which operates in the power save mode, through a predetermined channel (operation 1110) and retransmitting the magic packet to the second device through the predetermined channel if a response to the magic packet has not been received from the second device and a predetermined time has not elapsed after transmitting the magic packet through the predetermined channel (operation 1120).

Figure 12:
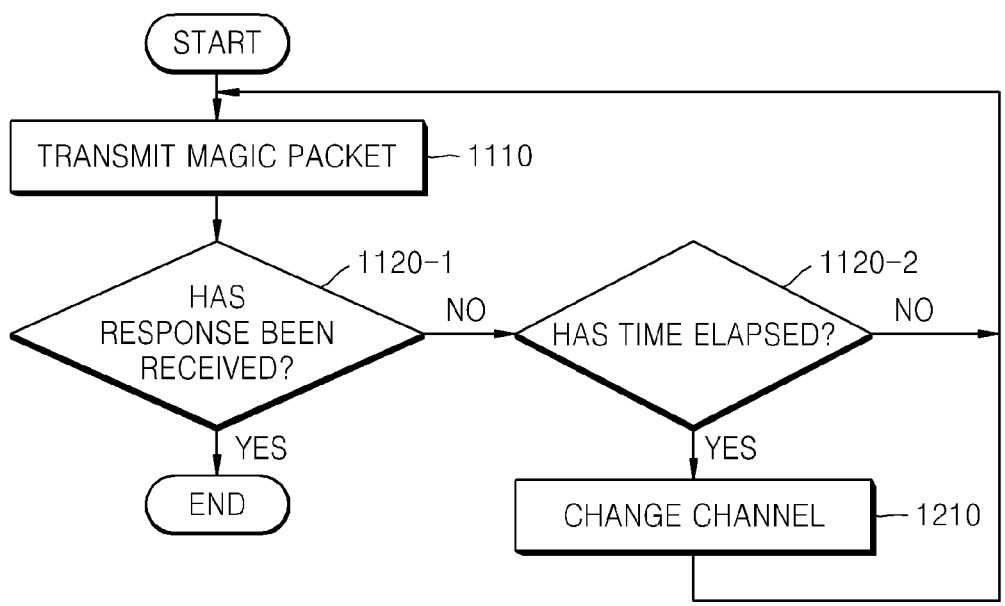
FIG. 12 is a flowchart of a method for switching a second device from the power save mode to the active mode by a first device, according to another exemplary embodiment.

FIG. 12 is a flowchart of a method for switching a second device from the power save mode to the active mode by a first device, according to another exemplary embodiment. Although the method shown in FIG. 12 is similar to the method shown in FIG. 11, the method shown in FIG. 12 further includes transmitting the magic packet through a different channel from the predetermined channel by changing a transmission channel if a response to the magic packet has not been received from the second device and the predetermined time has elapsed after first transmitting the magic packet through the predetermined channel (operation 1210).

Figure 13:
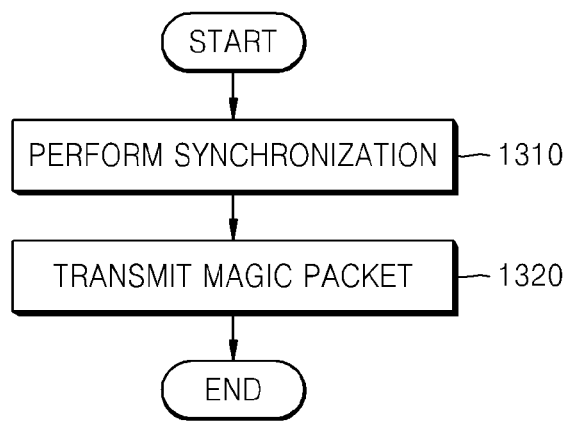
FIG. 13 is a flowchart of a method for switching a second device from the power save mode to the active mode by a first device, according to another exemplary embodiment.

FIG. 13 is a flowchart of a method for switching a second device from the power save mode to the active mode by a first device, according to another exemplary embodiment. Referring to FIG. 13, the method for switching the second device from the power save mode to the active mode by the first device includes performing synchronization by forming a P2P group with the second device (operation 1310) and transmitting a magic packet to the second device when the second device operating in the power save mode is in the awake state based on the synchronization (operation 1320).

Figure 14:
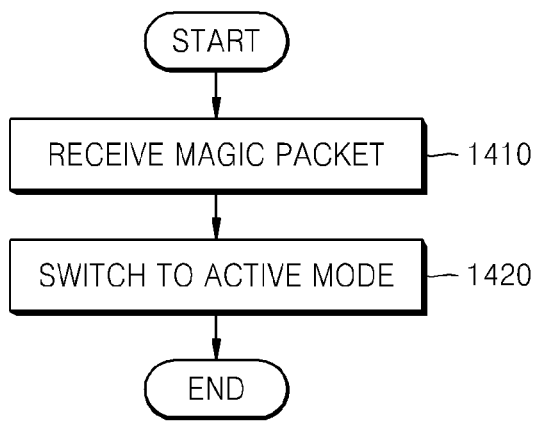
FIG. 14 is a flowchart of a method for switching from the power save mode to the active mode by a second device communicating with a first device, according to an exemplary embodiment.

FIG. 14 is a flowchart of a method for switching from the power save mode to the active mode by a second device communicating with a first device, according to an exemplary embodiment. Referring to FIG. 14, the method for switching from the power save mode to the active mode in the second device communicating with the first device includes receiving a magic packet from the first device when the second device operating in the power save mode is in the awake state (operation 1410) and switching to the active mode upon receiving the magic packet (operation 1420).

Figure 15:
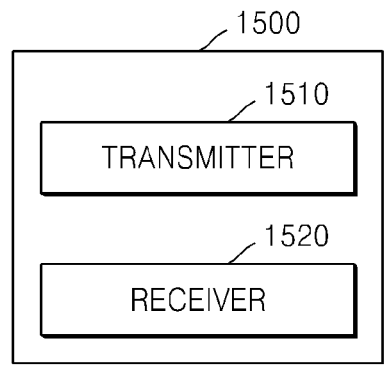
FIG. 15 is a block diagram of an apparatus for switching a peer device from the power save mode to the active mode, according to an exemplary embodiment.

FIG. 15 is a block diagram of an apparatus 1500 for switching a peer device from the power save mode to the active mode, according to an exemplary embodiment. Referring to FIG. 15, the apparatus 1500 includes a transmitter 1510 for transmitting a magic packet to the peer device, which operates in the power save mode, through a predetermined channel and a receiver 1520 for receiving a response to the magic packet from the peer device, wherein the transmitter 1510 retransmits the magic packet to the peer device through the predetermined channel if a response to the magic packet has not been received from the peer device and a predetermined time has not elapsed after transmitting the magic packet through the predetermined channel.

Figure 16:
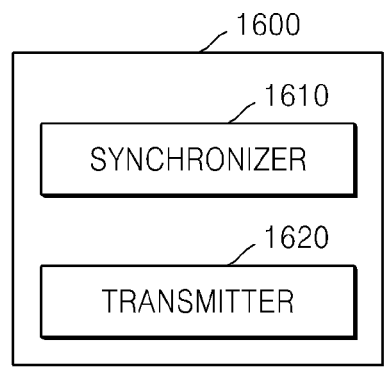
FIG. 16 is a block diagram of an apparatus for switching a peer device from the power save mode to the active mode, according to another exemplary embodiment.

FIG. 16 is a block diagram of an apparatus 1600 for switching a peer device from the power save mode to the active mode, according to another exemplary embodiment. Referring to FIG. 16, the apparatus 1600 includes a synchronizer 1610 for performing synchronization by forming a P2P group with the peer device and a transmitter 1620 for transmitting a magic packet to the peer device when the peer device operating in the power save mode is in the awake state based on the synchronization.

Figure 17:
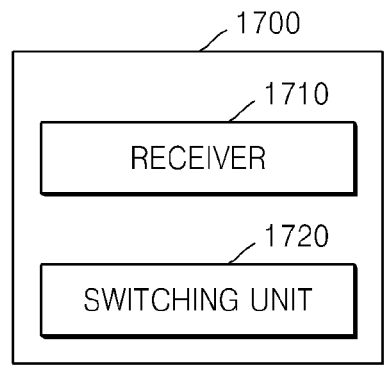
FIG. 17 is a block diagram of an apparatus for switching from the power save mode to the active mode, according to an exemplary embodiment.

FIG. 17 is a block diagram of an apparatus 1700 for switching from the power save mode to the active mode, according to an exemplary embodiment. Referring to FIG. 17, the apparatus 1700 includes a receiver 1710 for receiving a magic packet when the peer device operating in the power save mode is in the awake state and a switching unit 1720 for switching to the active mode upon receiving the magic packet.

The inventive concept can also be embodied as computer-readable codes on a computer readable recording medium. Examples of the computer-readable recording medium include magnetic storage media, optical recording media, and storage media such as carrier waves (e.g., transmission through the Internet). In addition, data formats of messages used in the invention can be recorded on the computer readable recording medium.

While this inventive concept has been shown and described in detail with reference to exemplary embodiments shown in the accompanying drawings thereof, these embodiments are to be regarded as merely exemplary not to limit the inventive concept. Although specific terms are used in the specification, these terms are not used to limit meaning or the scope of the claims but used to describe the inventive concept. Therefore, it will be understood by those of ordinary skill in the art that the inventive concept can be implemented by various modified forms and other equivalent embodiments realizing the principle of the inventive concept through deletion, substitution, or modification in various forms without departing from the essential technical spirit of the inventive concept defined by the appended claims although not clearly described or shown in the specification.

What is claimed is:

1. A method for switching a second device from a power save mode to an active mode by a first device, the method comprising:
   transmitting, by the first device, a magic packet through a predetermined channel to the second device, which operates in the power save mode by repeating a doze state and an awake state periodically according to a predetermined period of time, for notifying the second device to switch to the active mode, wherein the magic packet includes contents of a command for switching a value of a power management field which is a subfield of a frame control field of the second device receiving the magic packet; and
   retransmitting the magic packet to the second device through the predetermined channel if a response to the magic packet has not been received from the second device and a predetermined time has not elapsed after transmitting the magic packet through the predetermined channel.

2. The method of claim 1, further comprising transmitting the magic packet through a different channel from the predetermined channel if the response to the magic packet has not been received from the second device and the predetermined time has elapsed after first transmitting the magic packet through the predetermined channel.

3. The method of claim 1, wherein the predetermined time is longer than a time for the second device to be in the doze state.

4. The method of claim 1, wherein the predetermined time is the same as the predetermined period of time.

5. The method of claim 1, wherein the predetermined period of time is a beacon interval.

6. The method of claim 1, wherein the predetermined channel comprises a channel, which was last used by the first device to communicate with the second device.

7. The method of claim 1, wherein the predetermined channel comprises a social channel.

8. The method of claim 1, further comprising the first device forming a Peer to Peer (P2P) group with the second device if the response to the magic packet has been received from the second device.

9. The method of claim 8, wherein the forming of the P2P group comprises the first device forming the P2P group with the second device by using Credentials stored in the first device.

10. The method of claim 1, wherein the first device is a P2P client, and the second device is a P2P group owner.

11. The method of claim 1, wherein the magic packet is a probe request frame, wherein a value of a bit 6 or 7 of a device capability bitmap field of a P2P capability subelement of the probe request frame is 1.

12. The method of claim 1, wherein the magic packet is a P2P public action frame, a type value of which is one of 9 to 255.

13. The method of claim 1, wherein the magic packet is a P2P action frame, a type value of which is one of 4 to 255.

14. The method of claim 1, wherein the first device and the second device are wireless fidelity (Wi-Fi) P2P devices.

15. A computer-readable non-transitory recording medium storing a computer-readable program for executing the method of claim 1.

16. A method for switching from a power save mode to an active mode by a second device communicating with a first device, the method comprising:
   receiving, from the first device, a magic packet for notifying the second device to switch to the active mode when the second device operating in the power save mode by repeating a doze state and an awake state is in the awake state, wherein the magic packet includes contents of a command for switching a value of a power management field which is a subfield of a frame control field of the second device receiving the magic packet; and switching to the active mode upon receiving the magic packet.

17. The method of claim 16, wherein the receiving the magic packet comprises the second device receiving the magic packet in a state of not being synchronized with the first device.

18. The method of claim 16, further comprising the second device forming a Peer to Peer (P2P) group with the first device after switching to the active mode.

19. The method of claim 18, wherein the forming of the P2P group comprises the second device forming the P2P group with the first device by using Credentials stored in the second device.

20. The method of claim 16, further comprising performing synchronization by the second device forming a P2P group with the first device,
wherein the receiving of the magic packet comprises receiving the magic packet from the first device when the second device is in the awake state, based on the synchronization.

21. The method of claim 16, wherein the first device is a P2P client, and the second device is a P2P group owner.

22. The method of claim 21, wherein the receiving of the magic packet by the second device comprises receiving the magic packet from the first device after transmitting a beacon to the first device when the second device is in the awake state.

23. A computer-readable non-transitory recording medium storing a computer-readable program for executing the method of claim 16.

24. An apparatus for switching a peer device from a power save mode to an active mode, the apparatus comprising:
a transmitter for transmitting through a predetermined channel a magic packet for notifying the peer device, which operates in the power save mode by repeating a doze state and an awake state periodically according to a predetermined period of time to switch to the active mode, wherein the magic packet includes contents of a command for switching a value of a power management field which is a subfield of a frame control field of the peer device receiving the magic packet; and
a receiver for receiving a response to the magic packet from the peer device,
wherein the transmitter retransmits the magic packet to the peer device through the predetermined channel if a response to the magic packet has not been received from the peer device and a predetermined time has not elapsed after transmitting the magic packet through the predetermined channel.

25. An apparatus for switching a peer device from a power save mode to an active mode, the apparatus comprising:
a receiver for receiving a magic packet for notifying the peer device to switch to the active mode when the peer device operating in the power save mode by repeating a doze state and an awake state is in the awake state, wherein the magic packet includes contents of a command for switching a value of a power management field which is a subfield of a frame control field of the peer device receiving the magic packet; and
a switching unit for switching to the active mode upon receiving the magic packet.

\* \* \* \* \*